July 28, 1931.  L. H. CHURCH  1,816,670
CAPPED ELBOW
Filed Dec. 27, 1926

INVENTOR
Lewis H. Church
BY
Bohleber & Ledbetter
ATTORNEYS

Patented July 28, 1931

1,816,670

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CAPPED ELBOW

Application filed December 27, 1926. Serial No. 157,011.

This invention relates to electric conduit fittings and more particularly to capped elbows for connecting conduits and pipe lines, and relates to lock-on caps for permanently closing an elbow, pipe fitting, pipe end or the like.

An object of the invention is to produce a novel lock-on cap including instrumentalities which engage a shouldered or serrated or notched pipe end or fitting by which the pipe or fitting cannot be opened once the installation is completed.

A further object is the provision of a capped elbow whereof the cap is adapted to be permanently and irremovably locked on the elbow when the parts have been assembled to prevent tampering with the wiring after the installation is complete, but which cap, even though locked on the elbow for convenience in handling and to hold the parts together, may be unlocked and removed before installation to permit the electrical transmission lines to be installed and electrical connections made or wires joined in or at the capped elbow.

According to the invention, locking means are concealed between the cap and elbow and include means accessible through a neck or branch of the elbow to disengage the locking means from the head and enable the cap to be removed before the elbow branches are connected to a conduit system. More particularly a latch, preferably in the form of a leaf spring, has one end anchored and the other end movably free to spring into and engage a shoulder, notch or groove so that before the elbow is installed in a conduit line, the latch may be depressed or sprung back out of engagement from the shoulder or notch by a tool or one's finger inserted through one of the necks, but after the elbow is installed, with conduits threaded into the elbow necks, the leaf spring latch is inaccessible and the cap permanently locked on the elbow against removal, and the latch and notch are hidden from view.

Reference will now be had to the accompanying drawing illustrating an embodiment or example of the invention.

Figure 1:
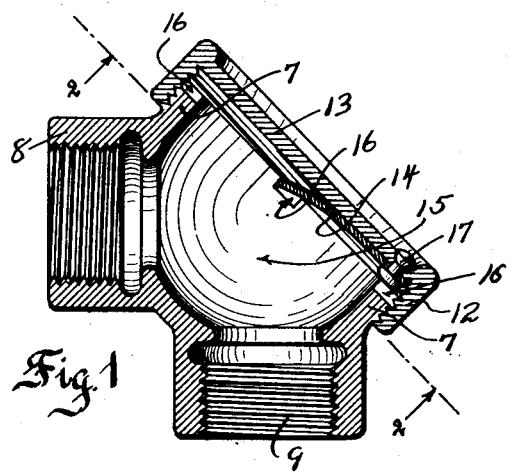
Figure 1 is a longitudinal section of one type of capped elbow constructed according to the present invention.
Figure 2:
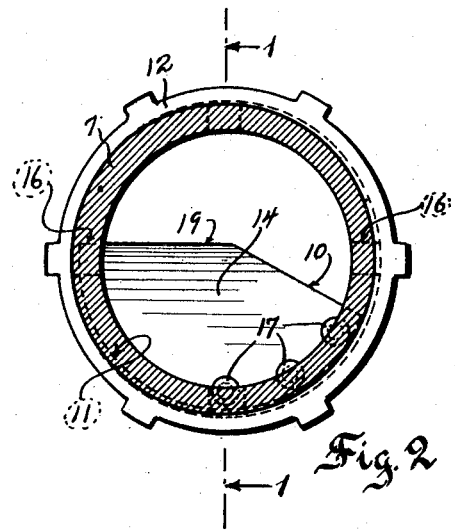
Figure 2 is a view in section, taken on the line 2—2 of Figure 1, and showing particularly the manner in which the leaf spring latch extends across the opening in the head for engagement by a tool or one's finger inserted through one of the elbow necks or branches to release the latch.
Figure 3:
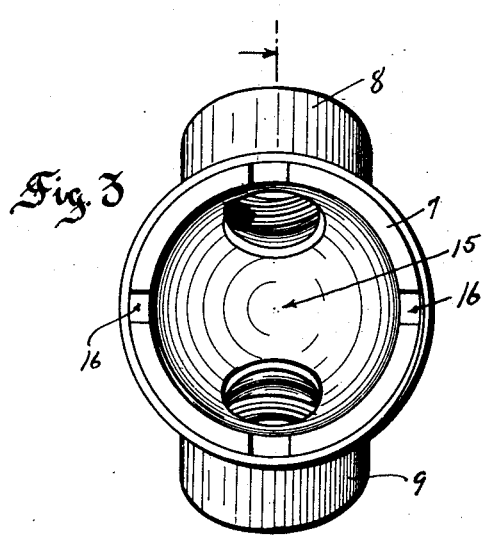
Figure 3 is a front view of the elbow with the cap removed looking into the open head.
Figure 4:
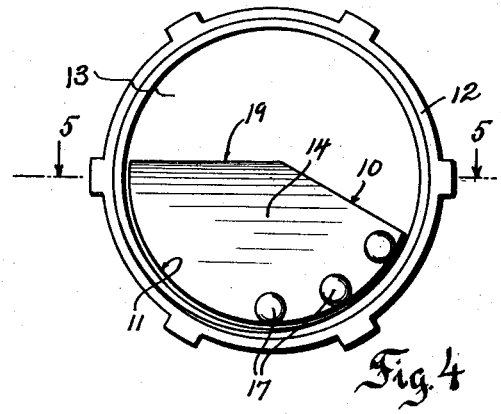
Figure 4 shows the cap looking from below showing the spring latch or pawl carried on the inside thereof.
Figure 5:
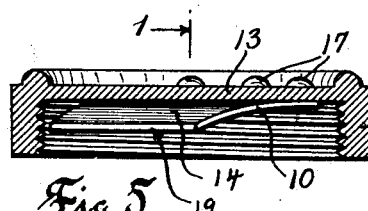
Figure 5 is a sectional view of the cap on the line 5—5 of Figure 4.
Figure 6:
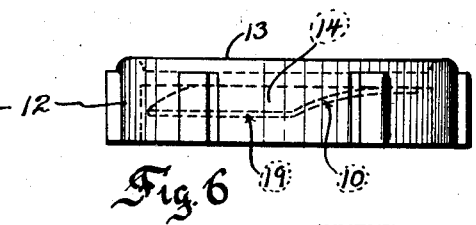
Figure 6 is a side elevation of the cap showing the inside construction and locking means in dotted lines.

The conduit fitting or elbow in the illustrated embodiment may consist of a substantially hollow hemispherical head or tubular member 7 formed with diverging threaded hollow necks or one or more branches 8 and 9 or any other suitable pipe-connecting means which is adapted to receive pipes or conduits and through which wires or electric transmisson lines or other installations extend. While the head 7 is illustrated as hemispherical, it is obvious that any suitably shaped communicating passage between the pipe-connecting means or branches 8 and 9 may be adopted. The large hollow space or enclosing chamber 15 defined by the head wall 7 affords a large space for inspecting or making wiring connections and concealing the same in the elbow by a lock-on cap embodying the principles of this invention to insure against tampering with the installation once it is completed and the cap is screwed home.

The circular wall 7 is threaded to receive a lock-on cap which cannot be removed after the elbow is installed and my invention distinguishes itself in that respect in that the lock-on cap may be removed from the elbow to install it and permit access to the wires in the conduit but cannot be removed by any one thereafter. The wall 7 of the elbow is serrated, grooved, slotted, shouldered, or notched in its rim or outer edge, as at 16, in one or more places or all around and this constitutes one of the hidden locking elements to engage and anchor a cap over the elbow as will be explained.

This invention seeks to permanently lock a cap 13 onto the elbow head 7 after the parts are assembled so that the cap cannot be removed and the wiring tampered with after installation. The cap includes an internally threaded flange 12 which screws onto the threaded head 7. This flange 12 contributes toward concealing the notch 16 after the cap is in position and prevents tampering with the snap spring latch as will be seen.

A resilient or spring pawl latch or, as it is illustrated, a leaf or plate spring 14 is secured to the cap 13 and deflected therefrom to engage in the ratchet notches 16 formed in the rim of the head. Anchorage means such as rivets 17 secure the spring latch 14 to the cap and are disposed proximate the flange 12, the leaf spring being segmental in shape to permit this disposition of parts, i. e., the spring latch 14 has a curved outer edge 11 which conforms with and fits closely to the inside of the cap flange 12 and thus the latch edge 11 also conforms to the rim of the head 7. The rivets 17 are disposed along the spring latch edge 11 so as to abut against the rim of the head and be backed up thereby.

Thus, when the cap is mounted on the elbow head, the rim of the head 7 backs up the rivets so that even though the heads of the rivets are cut off, the rivets cannot be punched inwardly through the cap to loosen the latch and permit the removal of the cap. Other forms of anchorage means and latch device may be used so long as the same are concealed by the cap 13 and its flange 12.

It is seen that the spring latch 14 may have one edge 10 directed inwardly toward the center of the cap to meet the free latch spring end or edge 19 which snaps into the elbow notch 16. This cut away edge 10 removes a nonessential portion of the spring latch thereby rendering the spring flexible and more easily to disengage from the notch 16. This latch construction permits the free edge to extend well across the elbow neck or necks so one's finger can reach through and touch the latch 14 to spring it back out of the notch 16. Furthermore, this or similar construction permits in the spring latch an outer flexible edge 19 and a long arcuate anchorage edge 11.

For handling purposes, it is found convenient to assemble the cap on the elbow, which obviously will cause the latch 14 to automatically lock the cap on the elbow. As the leaf spring 14 extends across the interior surface toward the center of the cap 13, the latch edge 19 is accessible through one of the hollow necks 8 or 9 and thus, before the fitting has been installed, a tool may be inserted through a neck and the leaf spring depressed out of engagement with the notch 16 to permit rotation and removal of the cap. But after the fitting is installed and conduits or pipes are threaded in the necks, the cap, once assembled on the fitting, is incapable of being removed, since the leaf spring 14 is concealed by the flange 12 and the rivets 17 are backed up by the elbow rim.

Various modifications are possible in the character of the fittings with which the locking means according to the present invention is employed as well as in the shape of the latch 14 and the character of the shoulders, teeth or slots in the rim 11 with which it engages. Any suitable lock-on ratcheting means may be employed so long as it is accessible through one of the installation or pipe-screwing openings 8 or 9 at the rear of the fitting so that the cap 13 can be removed by the user before the pipes and wires or other installations are assembled with the neck means 8 or 9.

The cap 13 fills all the requirements of a lock-on cover for elbows, pipe ends, or other places where it is desirable to positively seal a pipe fitting against tampering or tapping of lines near an electric meter or other places in water supply systems and the like. It is seen that I have provided means to insure against tampering with enclosed installations such as electric wiring or any other installation wherein it may be desirable to protect the same by a closure cap locked onto an enclosing means such as a pipe or housing means in which the installation is carried.

What I claim is:

1. A capped elbow comprising, an elbow part including a head and hollow neck, a removable cap part which is adapted to be screw threaded onto the head, a leaf spring concealed between the cap and head parts, including means to anchor the spring to one part, a portion of the spring being in line with the neck to permit disengagement of the leaf spring by reaching through the neck, and a shoulder carried with the other part for engagement by the leaf spring.

2. A capped elbow comprising, an elbow member including a head provided with a notch and hollow neck, a removable cap screw threaded onto the head; a leaf spring carried with the cap and adapted to engage the notch, and an operative portion of said leaf spring being accessible through the neck whereby the latter may be disengaged from said notch by reaching through the neck.

3. Pipe connecting means comprising; an elbow member including, a head, and a plurality of hollow branch necks; a rotatable removable cap covering the head, a spring pawl secured to the inner surface of the rotatable cap and extending thereacross toward the center of the cap, and means carried with the head for locking engagement with the spring pawl to prevent removal of the cap except by disengaging the spring pawl by entry through a branch neck.

4. A lock-on cap for a pipe fitting having a tubular end provided with a locking notch and comprising a cap including a threaded flange, a plate-like sprng latch within the flange to engage the locking notch and including an edge of the plate-like spring which is curved to conform to that of the flange, means to anchor a portion of the curved-spring edge to the cap adjacent the flange and leaving the remaining edge portions flexibly free.

5. A lock-on cap for a pipe fitting having a tubular end provided with a locking notch comprising a cap including a threaded flange, a spring latch made of a flat plate within the flange and adapted to engage the locking notch, and including an edge curved to conform to that of the flange, a cut-away edge extending from the curved edge toward the center of the cap, and means to anchor the curved spring edge to the cap adjacent the flange leaving another edge flexibly free.

6. A capped conduit fitting for pipes comprising a hollow member including pipe-connecting means and threaded means to carry a cover cap, a threaded removable cap covering the member, and locking means concealed under the cap including means accessible through the pipe-connecting means to disengage the locking means.

7. A capped connection between pipes comprising a hollow connecting member including a threaded head with a notch and pipe-connecting means, a removable cap having a flange screw threaded onto the head, and a spring-plate latch secured to the cap for engaging the notch and being concealed by the flange and the threaded head when assembled including means accessible through the pipe-connecting means to flex the latch and disengage it from the notch.

8. A capped pipe fitting comprising a threaded head having pipe-connecting means and a locking notch, a removable threaded cap including a flange adapted to cover the head, a segmental-leaf spring extending across the cap in line with the pipe-connecting means and engaging the locking notch, accessible through the pipe-connecting means to disengage the spring, and means anchoring one edge of the spring to the cap proximate the flange.

9. Means to insure against tampering with an enclosed installation comprising an enclosing member having openings, one of which openings receives the installation extending therethrough, and a rotatable lock-on closure for the other opening, said member and rotatable closure being provided with interengaging means whereby relative movement therebetween secures them together to close the opening; and locking means to insure against removal of the rotatable lock-on closure, accessible only from that opening through which the installation is received for unlocking said locking means.

10. A fitting for conduit wiring comprising a member having an opening in one of its walls permitting access to wiring in the fitting, and having another opening for the connection of a conduit through which wires are to be passed, a rotatable closure for said first mentioned opening, said closure and member being provided with interengaging means permitting a rotating movement of the closure relative to the member to secure them together and to close said opening, and further including means for locking said closure in closed position, accessible only through the opening which connects with a conduit for unlocking said locking means.

11. A fitting for conduits comprising a member having an opening permitting access to the interior thereof, and having another opening for the connection of a conduit, and a rotatable flanged cap for said first mentioned opening, said cap and fitting being provided with interengaging means permitting a rotating movement of the flanged cap relative to the member to secure them together and to close the first mentioned opening, and further including locking means comprising a ratchet and pawl for locking said cap in closed position, accessible only through the second mentioned opening.

12. A capped connection between two pipes comprising a hollow member having an opening therein including means to connect with pipes, and means to carry a cover cap over the opening, a rotatable removable cap covering the opening in the member; and locking means concealed under the cap and engagable upon rotation of the cap including means accessible through the means which connects with the pipes and depressible to disengage the locking means.

13. A capped connection between two pipes comprising a pipe connecting member including a threaded head provided with a notch and having a hollow neck, a removable cap having a flange screw threaded onto the head; and a spring-plate latch for engaging the notch and being concealed by the flange including means accessible through the neck to flex the latch whereby the latter may be disengaged by reaching through the neck.

In testimony whereof I affix my signature.

LEWIS H. CHURCH.